United States Patent Office 3,674,502
Patented July 4, 1972

3,674,502
NONRINGING BEVERAGES CONTAINING POLY(OXYETHYLENE) - POLY(OXYPROPYLENE) - POLY(OXYETHYLENE) COPOLYMERS
Raymond Honey, Mount Kisco, N.Y., and James Frank Perkins, Ramsey, N.J., assignors to Firmenich Incorporated, New York, N.Y.
No Drawing. Filed Sept. 5, 1969, Ser. No. 855,782
Int. Cl. A23l 1/26
U.S. Cl. 99—28                    5 Claims

ABSTRACT OF THE DISCLOSURE

Beverages which develop undesirable surface layers or rings during storage due to being flavored with normally difficultly dispersible flavor oils, such as citrus oils, mint oils and extracts of roots and herbs, are rendered clear and nonringing by use of poly(oxyethylene)-poly(oxypropylene)-poly(oxyethylene) copolymers therein.

BACKGROUND OF THE INVENTION

Enormous quantities of beverages such as carbonated sodas, non-carbonated fruit drinks, weight control dietary drinks, tonics and the like, flavored with citrus or mint oils or extracts of roots and herbs, are consumed annually in the United States and other countries. Generally, it is very difficult to disperse such flavor oils in the beverages due to incompatibility of the oils with water. As a result, there is a tendency for the oils, accompanied sometimes by soluble fats, proteins or gums in beverages containing such components, to rise to the surface of the beverage and there coalesce to form a layer or ring, which is referred to in the industry as the "ringing" effect. Not only is this ringing effect unsightly and esthetically displeasing to the consumer, but it also upsets uniform flavor balance in the beverage and thereby renders it distasteful to the palate.

Prior methods of countering the ringing effect have included use of flavors greatly diluted in sugar syrups or in solvents such as alcohol or propylene glycol. The drawback to these practices is that only a limited amount of the sugar syrup or solvent which does not cause an off-flavor in the beverage can be added, and therefore the amount of already diluted flavor oil that can be incorporated is correspondingly even more limited. This, in turn, often allows only very mild flavor effects to be achieved in the beverage, which detracts from the appeal and salability of the product.

Another conventional method has been to flavor beverages by addition of emulsions of the flavor oils prepared with the aid of brominated vegetable oils. The purpose of using such brominated oils is to adjust the specific gravity of the flavor oil emulsion so as to conform it more closely with that of the beverage to be flavored in order to achieve more complete and stable dispersion of the flavor oil in the beverage. However, serious disadvantages of brominated oils are that they tend to give a beverage a cloudy or hazy apperance and sometimes cause off-flavor due to rancidity. Also, there are indications that government approval for use of brominated oils may not continue indefinitely.

SUMMARY OF THE INVENTION

The present invention is based upon the discovery that beverages of the character described above, i.e. flavored with normally difficultly dispersible flavor oils and prone to the ringing effect, are rendered nonringing and sparkling clear without use of brominated oils or highly diluted flavors in solvents or syrups, by incorporating therein a poly(oxyethylene)-poly(oxypropylene)-poly(oxyethylene) block copolymer having a structure as follows:

$$\text{HO}-(\text{CH}_2\text{CH}_2\text{O})_a-(\overset{\overset{\displaystyle \text{CH}_3}{|}}{\text{CHCH}_2\text{O}})_b-(\text{CH}_2\text{CH}_2\text{O})_c-\text{H}$$

wherein the molecular weight of the polyoxypropylene moiety is in the range from about 1750 to about 4000, the total percentage by weight of the polyoxyethylene moieties is in the range from about 40% to about 80% and the total molecular weight calculated from the foregoing figures is in the range from about 2,900 to about 20,000. Such copolymers, when added to a beverage directly or as part of a compounded flavor formula, have a unique action of preventing a ringing effect at all desirable levels of flavor oil concentration, for the consumable life of the beverage without degrading the taste or physical appearance of the beverage. The uniqueness of such efficacy of the foregoing copolymers is demonstrated by the fact that attempts to achieve the same results with many other nonionic polymeric materials possessing surface active properties have not been successful.

DESCRIPTION OF THE PREFERRED EMBODIMENTS

The invention may be practiced in connection with any beverage which includes a flavor oil that is ordinarily difficult to dissolve or disperse therein and hence is subject to flotation and coalescence at the surface of the beverage in a layer or ring as previously described. More particularly, the advantages afforded by the invention will be of utility and value in any beverage which is flavored with a flavor oil (as defined hereinafter) and which, in the absence of the copolymers mentioned above, will show to visual inspection a ring or layer at its surface, different in appearance from the body of the beverage, after the beverage has been stored standing quietly at ambient temperature for up to 168 hours or less. For the consumable life of beverages within the foregoing category, i.e. the approximately six months to one year period which may elapse between manufacture and purchase and consumption of the beverage, the copolymers used in accordance with the invention will prevent ringing. Hence, the invention, and its benefits and advantages, are applicable to all beverage which conform to the category defined above.

As for the flavor oils which are included in the beverages to which the invention relates, the most widely used species of such flavor oils are natural or imitation citrus oils (the latter comprising mixtures of natural and artificial citrus oil compounds or wholly artificial compounds) such as orange, lemon, lime and grapefruit flavor oils. Other species in prevalent use are mint oils such as wintergreen, spearmint and peppermint oils, as well as extracts of various roots and herbs such as sweet birch, spruce, ginger, sassafras, sorghum and celery. As used in the specification and claims, the term "flavor oil" is to be regarded as including all of the foregoing specific flavor materials as well as others in the same category, as will be known to those skilled in the art.

The beverages in which the foregoing flavor oils and extracts are incorporated may be carbonated or non-carbonated and may vary in appearance from clear to opaque, for example, sodas and fruit drinks on the one hand and tonics and dietary drinks for weight control on the other, respectively. All of such beverages may be rendered nonringing, and transparently clear in the case of those which ordinarily are intended to have a clear appearance, by incorporating one or more of the previously-defined poly(oxyethylene)-poly(oxypropylene)-poly(oxyethylene) copolymers therein in accordance with the invention.

As previously-noted, these copolymers have a structure as follows:

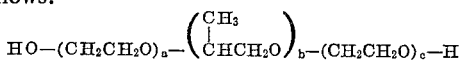

wherein the molecular weight of the polyoxypropylene moiety (the portion associated with subscript "$b$") is in the range from about 1750 to about 4000, the total percentage by weight of the polyoxyethylene moieties (the portions associated with subscripts "$a$" and "$c$") is in the range from about 40% to about 80% and the total molecular weight of the copolymer calculated from the foregoing figures is in the range from about 2,900 to about 20,000.

These copolymers are prepared by adding the required number of mols of propylene oxide to the two hydroxyl groups of propylene glycol to form a hydrophobic base and then adding ethylene oxide to both ends of the hydrophobic base to form hydrophilic polyoxyethylene groups of controlled length. Variation in the molecular weight of the hydrophobic polyoxypropylene base and the weight proportion of hydrophilic polyoxyethylene groups, within the ranges specified above, will provide differences in surface active properties from which one or more copolymers may be selected as particularly suitable for addition to a particular beverage, as determined by empirical tests. Especially valuable results have been achieved with use of a specie of the foregoing polymers wherein the molecular weight of the polyoxypropylene moiety is about 4000, the total percentage by weight of the polyoxyethylene moieties is about 70% and the total molecular weight calculated from the foregoing figures is about 13,330.

Various species of poly(oxyethylene)-poly(oxypropylene)-poly(oxyethylene) block copolymers, including those defined above as useful in the invention, are available commercially from Wyandotte Chemicals of Wyandotte, Mich., under the trademark Pluronic. The particular polymer described above as giving especially valuable results is available as Pluronic F-127 and its use in accordance with the invention is recommended for best results.

In practicing the invention, the poly(oxyethylene)-poly(oxypropylene)-poly(oxyethylene) copolymer may be added directly to a prepared beverage having the difficulty dispersible flavor oils or extracts therein. In such case, the amount of polymer required to render the beverage nonringing, and where applicable transparently clear, will vary from about 50% to about 100% based upon the weight of the flavor ingredients. These proportions should be regarded as a general guide, since in specific instances less or more of the copolymer may possibly be found to be necessary or desirable for achieving the intended results.

Another way to carry out the invention is to include the poly(oxyethylene) - poly(oxypropylene) - poly(oxyethylene) copolymer in a concentrated compounded flavor formula which subsequently will be added to an aqueous base liquid to form the complete beverage. Such formulas are exemplified in the prior art by so-called bottler's extracts, which consist of flavor oils and compounds dispersed in sugar syrup or alcoholic solvents and are added to carbonated water or non-carbonated water in vending machines, at soda fountains or in the home to form consumable beverages.

When made in accordance with the invention, such concentrated flavor formulas may comprise solely the flavor ingredients and one or more of the useful poly(oxyethylene)-poly(oxypropylen)-poly(oxyethylene) copolymers. The proportion of the copolymer(s) in such formulas may vary from about 50% to about 100% based upon the weight of the flavor ingredients. Optional additional ingredients, other than the flavor ingredients and the copolymer, may also be included, e.g. colors, preservatives, carbohydrates, vegetable gums or colloids, thickening agents and the like, as will be known to those skilled in the art.

Further details of the invention will be evident from the following specific examples thereof in which all proportions are by weight unless otherwise indicated.

Example 1

An orange flavor composition in the form of an emulsion is made according to the following recipe:

| | | |
|---|---|---|
| Orange oil | lbs | 2 |
| Pluronic F-127 | lbs | 5 |
| Gum acacia | lbs | 10 |
| FD & C Yellow No. 6 | oz | 22 |
| FD & C Yellow No. 5 | oz | 5 |
| FD & C Red No. 1 | oz | 9 |
| Propylene glycol | gal | 2½ |
| Water—sufficient to make 25 gals. of emulsion. | | |

The foregoing emulsion may be added directly to aqueous liquids to prepare nonringing orange flavored beverages. The emulsion also may be used to prepare bottler's extract type compositions as illustrated in the succeeding example.

Example 2

A bottler's extract type composition is made according to the following recipe:

| | Fl. oz. |
|---|---|
| 50% citric acid solution in 1 gal. of 30° Baumé sugar syrup | 2½–3 |
| Emulsion of Example 1 | 2 |

The foregoing composition may be added to carbonated or non-carbonated liquids in the proportion of 1 oz. composition to 7 oz. liquid to prepare nonringing, clear beverages.

Any departure from the foregoing description which conforms to the present invention is intended to be included within the scope of the appended claims.

What is claimed is:

1. A nonringing beverage which comprises an aqueous liquid having dispersed therein at least one flavor oil and a poly(oxyethylene)-poly(oxypropylene)-poly(oxyethylene) copolymer having a structure as follows:

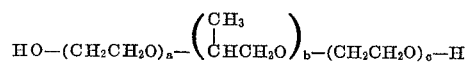

wherein the molecular weight of the polyoxypropylene moiety is in the range from about 1750 to about 4000, the total percentage by weight of the polyoxyethylene moieties is in the range from about 40% to about 80% and the total molecular weight of the copolymer calculated from the foregoing figures is in the range from about 2,900 to about 20,000.

2. A nonringing beverage according to claim 1 wherein said flavor oil is a citrus oil.

3. A nonringing beverage according to claim 1 wherein said copolymer comprises a molecular weight of the polyoxypropylene moiety of about 4000, a total percentage by weight of the polyoxyethylene moieties of about 70% and a total molecular weight of the copolymer calculated from the foregoing figures of about 13,330.

4. A nonringing beverage according to claim 1 wherein the amount of said copolymer is from about 50% to about 100% based upon the weight of said flavor ingredient.

5. In a beverage containing at least one flavor oil which is normally difficulty dispersible and subject to flotation and coalescence at the surface of said beverage, the improvement comprising the inclusion in said beverage of a poly(oxyethylene)-poly(oxypropylene) - poly(oxyethylene) copolymer having a structure as follows:

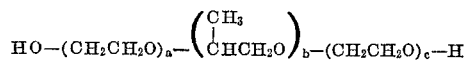

wherein the molecular weight of the polyoxypropylene moiety is in the range from about 1750 to about 4000, the total percentage by weight of the polyoxyethylene moieties is in the range from about 40% to about 80% and the total molecular weight of the copolymer calculated from the foregoing figures is in the range from about 2900 to about 20,000, said copolymer being included in an amount sufficient to prevent said flotation and coalescence.

References Cited

UNITED STATES PATENTS

| | | | |
|---|---|---|---|
| 3,353,961 | 11/1967 | Simon | 99—78 |
| 1,500,670 | 7/1924 | DeGroote | 99—28 X |
| 2,566,410 | 9/1951 | Griffin | 99—140 |
| 3,404,011 | 10/1968 | Eolkin | 99—140 |

FOREIGN PATENTS

| | | | |
|---|---|---|---|
| 119,426 | 1/1945 | Australia | 252—312 |

OTHER REFERENCES

McCutcheon's Detergents and Emulsifiers 1968 Annual, p. 174.

MORRIS O. WOLK, Primary Examiner

S. B. DAVIS, Assistant Examiner

U.S. Cl. X.R.

99—78, 79, 140 R; 252—312

PO-1050
(5/69)
M-4178

UNITED STATES PATENT OFFICE
CERTIFICATE OF CORRECTION

Patent No. 3,674,502                    Dated July 4, 1972

Inventor(s) RAYMOND HONEY and JAMES FRANK PERKINS

It is certified that error appears in the above-identified patent and that said Letters Patent are hereby corrected as shown below:

Column 4, line 7 "Orange oil  -  2 lbs." should read --Orange oil  -  5 lbs.--

Signed and sealed this 2nd day of January 1973.

(SEAL)
Attest:

EDWARD M. FLETCHER, JR.
Attesting Officer

ROBERT GOTTSCHALK
Commissioner of Patents